(12) United States Patent
Savatsky et al.

(10) Patent No.: US 10,865,261 B2
(45) Date of Patent: *Dec. 15, 2020

(54) METHODS OF MONITORING AND CONTROLLING THE MELT INDEX OF A POLYOLEFIN PRODUCT DURING PRODUCTION

(71) Applicant: Univation Technologies, LLC, Houston, TX (US)

(72) Inventors: Bruce J. Savatsky, Kingwood, TX (US); Daniel N. Thomas, Jr., South Charleston, WV (US); Timothy R. Lynn, Middlesex, NJ (US)

(73) Assignee: Univation Technologies, LLC, Houston, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/409,952

(22) Filed: May 13, 2019

(65) Prior Publication Data

US 2019/0263951 A1 Aug. 29, 2019

Related U.S. Application Data

(63) Continuation of application No. 15/527,035, filed as application No. PCT/US2015/062355 on Nov. 24, 2015, now Pat. No. 10,329,365.

(Continued)

(51) Int. Cl.
*C08F 210/16* (2006.01)
*G05B 17/00* (2006.01)
(Continued)

(52) U.S. Cl.
CPC .......... *C08F 210/16* (2013.01); *B01J 8/1809* (2013.01); *B01J 8/1827* (2013.01); *B01J 8/1836* (2013.01);
(Continued)

(58) Field of Classification Search
CPC ................ C08F 210/16; C08F 4/65922; C08F 2400/02; B01J 8/1809; B01J 8/1827;
(Continued)

(56) References Cited

U.S. PATENT DOCUMENTS 7,157,531 B2 1/2007 Szul et al.
7,838,605 B2 11/2010 Sandell et al.
(Continued)

OTHER PUBLICATIONS

International Search Report and Written Opinion for related PCT Application PCT/US2015/062355, dated Mar. 7, 2016 (13 pgs).
(Continued)

*Primary Examiner* — William K Cheung
(74) *Attorney, Agent, or Firm* — Brooks, Cameron & Huebsch, PLLC

(57) ABSTRACT

Methods for producing polyolefin polymers may use a predictive melt index regression to estimate the melt index of the polyolefin during production based on the composition of the gas phase and, optionally, the concentration of catalyst in the reactor or reactor operating conditions. Such predictive melt index regression may include multiple terms to account for concentration of ICA in the reactor, optionally concentration of hydrogen in the reactor, optionally concentration of comonomer in the reactor, optionally the catalyst composition, and optionally reactor operating conditions. One or more terms may independently be represented by a smoothing function that incorporates a time constant.

13 Claims, 4 Drawing Sheets

Related U.S. Application Data

(60) Provisional application No. 62/084,235, filed on Nov. 25, 2014.

(51) Int. Cl.
*B01J 8/18* (2006.01)
*C08F 4/6592* (2006.01)

(52) U.S. Cl.
CPC ..... *G05B 17/00* (2013.01); *B01J 2208/00061* (2013.01); *B01J 2208/00274* (2013.01); *B01J 2208/00539* (2013.01); *B01J 2208/00548* (2013.01); *B01J 2208/00628* (2013.01); *B01J 2208/00663* (2013.01); *B01J 2208/00725* (2013.01); *B01J 2208/00991* (2013.01); *C08F 4/65922* (2013.01); *C08F 2400/02* (2013.01)

(58) Field of Classification Search
CPC ............ B01J 8/1836; B01J 2208/00061; B01J 2208/00274; B01J 2208/00539; B01J 2208/00548; B01J 2208/00628; B01J 2208/00663; B01J 2208/00725; B01J 2208/00991; G05B 17/00
USPC ......................................................... 526/60
See application file for complete search history.

(56) References Cited

U.S. PATENT DOCUMENTS

| | | | |
|---|---|---|---|
| 8,273,834 | B2 | 9/2012 | Markel et al. |
| 8,318,872 | B2 | 11/2012 | Savatsky et al. |
| 8,497,329 | B2 | 7/2013 | Kolb et al. |
| 9,718,896 | B2 | 8/2017 | Hari et al. |
| 2007/0060724 | A1 | 3/2007 | Ker et al. |
| 2009/0234081 | A1 | 9/2009 | Thomas et al. |
| 2010/0144983 | A1 | 6/2010 | Markel et al. |
| 2010/0286346 | A1 | 11/2010 | Muhle et al. |
| 2015/0210782 | A1* | 7/2015 | Hari .................... C08F 2/34 526/61 |

OTHER PUBLICATIONS

Second Written Opinion for related PCT Application PCT/US2015/062355, dated Oct. 27, 2016 (8 pgs).

International Preliminary Report on Patentability for related PCT Application PCT/US2015/062355, dated Feb. 8, 2017 (20 pgs).

* cited by examiner

METHODS OF MONITORING AND CONTROLLING THE MELT INDEX OF A POLYOLEFIN PRODUCT DURING PRODUCTION

This application is a Continuation of U.S. National Stage Application Ser. No. 15/527,035, filed May 16, 2017, now issued as U.S. Pat. No. 10,329,365, which is a U.S.C. § 371 of International Application Number PCT/US2015/062355, filed Nov. 24, 2015 and published as WO 2016/085945 on Jun. 2, 2016, which claims the benefit to U.S. Provisional Application 62/084,235, filed Nov. 25, 2014, the entire contents of which are incorporated herein by reference in its entirety.

BACKGROUND

The exemplary embodiments described herein relate to methods for producing polyolefin polymers.

Typical polyolefin polymerization reactions in a fluidized bed gas phase reactor employ a continuous cycle. In one part of the cycle, a cycling gas stream (sometimes referred to as a recycle stream or fluidizing medium) is heated in the reactor by the heat of polymerization. This heat is removed from the recycle stream in another part of the cycle by a cooling system external to the reactor. Generally, in a gas fluidized bed process for producing a polyolefin product, the recycle stream is a primarily gaseous stream containing an olefin monomer, optionally hydrogen, and optionally at least one comonomer that is continuously cycled through the fluidized bed in the presence of a catalyst under reactive conditions. The recycle stream is withdrawn from the fluidized bed and (after cooling) is recycled back into the reactor. Simultaneously, polymer product is withdrawn from the reactor and fresh olefin monomer, the optional hydrogen, and the optional comonomers are added to replace any that has polymerized or been entrained in the polyolefin product stream.

In some conventional polymerization reactions, a fluidized bed gas phase reactor system operates in a "condensed mode" (e.g., as described in International Patent App. Pub. No. WO 2007/030915) in which the recycle stream is cooled to a temperature below the dew point in the reactor. Typically, this is accomplished by including induced condensing agents (ICA) in an appropriate concentration and controlling the recycle stream temperatures so as to condense the ICA portion of the recycle gas stream. Generally, condensed mode production of polyolefins in fluidized bed gas phase reactors enables greater production rate of the polyolefin.

Typically, a polyolefin production run is performed over several days to produce tons of product. One of the important properties of the polyolefin product is the melt index, which is related to molecular weight. Typically, a several day production run is designed to produce product within a melt index range defined by the product specification. Generally, it is believed that the type and amount of catalyst used, reactor temperature, monomer concentration, comonomer concentration, and hydrogen concentration (if hydrogen is used) in the reactor are production parameters that can affect the melt index of the produced polyolefin.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
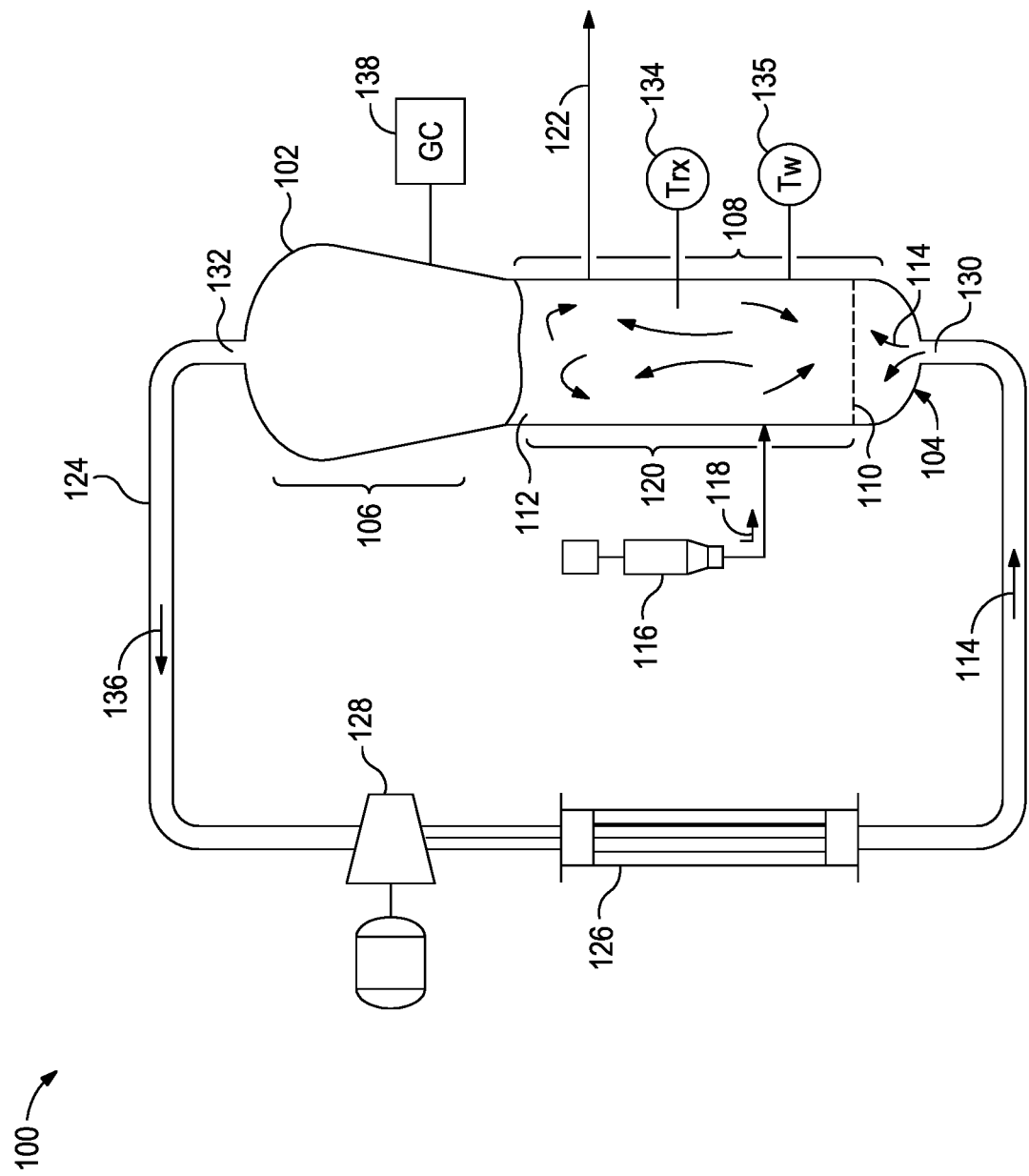
FIG. 1A is a schematic diagram of a polymerization system that can be monitored and controlled in accordance with some of the embodiments described herein.

The exemplary embodiments described herein relate to methods for producing polyolefin polymers using a predictive melt index regression to estimate the melt index of the polyolefin during production based on the composition of the gas phase and, optionally, the concentration of catalyst in the reactor.

The predictive melt index regression described herein includes a term for the ICA concentration in the gas phase of the reactor. Surprisingly, it has been discovered that the ICA concentration has a significant impact on the melt index of the polyolefin. Additionally, this effect is not instantaneous but rather can be cumulative over tens of minutes to hours, which is accounted for using a smoothing function that incorporates a time constant when representing the ICA concentration in the predictive melt index regression.

The predictive melt index regression may then be used for forecasting changes to the melt index based on changes to the composition of the gas phase and, optionally, the concentration of catalyst in the reactor. Additionally, the regression may be used for adjusting the composition of the gas phase and, optionally, the concentration of catalyst in the reactor to maintain the melt index within or return the melt index to within the specification thresholds.

In some instances, polyolefin product that is significantly outside the specification thresholds is disposed of or downgraded to a less profitable product. Therefore, the predictive melt index regression may be useful in producing higher value polyolefin by reducing or eliminating off specification product because the melt index may be more stable.

As used herein, the term "ICA" refers to the total ICA in the reactor and encompasses compositions with one or more ICA components. As used herein, the term "ICA component" refers to individual components of an ICA. For example, an ICA may include isopentane, n-butane or a combination thereof. Exemplary ICA components suitable for use in the methods described herein may include, but are not limited to, n-butane, isobutane, n-pentane, isopentane, hexane, isohexane, and other hydrocarbon compounds that are similarly non-reactive in the polymerization process. In some instances, an ICA may include a combination of the foregoing components.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. As such, "instantaneous" values of a property may, in some cases, be obtained or estimated using a model, rather than direct measurement. In contrast, with reference to a product being produced by a continuous reaction, "average" (or "bed average") value (at a time "T") of a property herein denotes the value of the property of the product that exits the reactor at time T and may be measured directly.

As used herein, the term "polyethylene" denotes a polymer of ethylene and optionally one or more $C_3$-$C_{18}$ alpha-olefins, while the term "polyolefin" denotes a polymer of one or more $C_2$-$C_{18}$ alpha-olefins.

As used herein, the term "melt index" refers to a measure of the use of flow of the melt of the thermoplastic polymer. For example, melt index may be measured according to ASTM D1238-13 at any suitable weight and temperature. Generally, the melt index of polyolefins is measured at 2.16 kg at 190° C., 5 kg at 190° C., or 21.6 kg at 190° C.

Reactor

The methods described herein may be used in any number of pilot plant or commercial size reactors including any number of designs. For example, the model can be used in commercial-scale reactions, such as gas-phase fluidized-bed polymerization reactions, that can be monitored and optionally also controlled in accordance with the invention. Some such reactions can occur in a reactor having the geometry of the fluidized bed reactor 102 discussed with respect to FIG. 1A. In other embodiments, a reactor is monitored and optionally also controlled in accordance with the invention while it operates to perform polymerization using any of a variety of different processes (e.g., slurry, or gas phase processes).

FIG. 1A is a schematic diagram of a polymerization system 100 that can be monitored and controlled in accordance with embodiments described herein. The polymerization system 100 includes a fluidized bed reactor 102. The fluidized bed reactor 102 has a bottom end 104, a top expanded section 106, a straight section 108, and a distributor plate 110 within the straight section 108. A fluidized bed 112 of granular polymer and catalyst particles is contained within the straight section 108, and may optionally extend slightly into the top expanded section 106. The bed is fluidized by the steady flow of recycle gas 114 through the distributor plate 110. The flow rate of the recycle gas 114 is regulated to circulate the fluidized bed 112, as illustrated in FIG. 1A. In some implementations, a superficial gas velocity of about 1 ft/sec to about 3 ft/sec is used to maintain a fluidized bed 112 in the reactor 102 while operating the reactor 102 at a total pressure of about 300 psi.

The polymerization system 100 has one or more catalyst feeders 116 for controlling the addition of polymerization catalyst 118 to a reaction zone 120 within the fluidized bed 112. Within the reaction zone 120, the catalyst particles react with a primary monomer (e.g., ethylene) and optionally a comonomer and other reaction gases (e.g., hydrogen) to produce the granular polymer particles. As new polymer particles are produced, other polymer particles are continually withdrawn from the fluidized bed 112 through a product discharge system 122. The fluidized bed 112 may be maintained at a constant height by withdrawing a portion of the fluidized bed 112 at a rate equal to the rate of formation of particulate product. The product may be removed continuously or nearly continuously via a series of valves (not shown) into a fixed volume chamber (not shown), which is simultaneously vented back to the reactor. This allows for highly efficient removal of the product, while recycling a large portion of the unreacted gases back to the reactor.

After passing through the product discharge system 122, the polymer granules may be degassed (or "purged") with a flow of inert gas such as nitrogen to remove substantially all of the dissolved hydrocarbon materials. In some instances, the polymer granules may be treated with a small stream of humidified nitrogen to deactivate any trace quantities of residual catalyst.

The polymerization system 100 also has a cooling loop which includes a recycle gas line 124, a cooler 126 (such as a circulating gas cooler), and a compressor 128, coupled with the fluidized bed reactor 102. During operation, the cooled circulating gas from the cooler 126 flows through inlet 130 into the fluidized bed reactor 102, then propagates upward through the fluidized bed 112 and out from the fluidized bed reactor 102 via outlet 132.

The top expanded section 106 is also known as a "velocity reduction zone," and is designed to minimize the quantities of particle entrainment from the fluidized bed. The diameter of the top expanded section 106 generally increases with the distance from straight section 108. The increased diameter causes a reduction in the speed of the recycle gas 114, which allows most of the entrained particles to settle back into the fluidized bed 112, thereby minimizing the quantities of solid particles that are "carried over" from the fluidized bed 112 through the recycle gas line 124. Finer entrained particles and dust may optionally be removed in a cyclone and/or fines filter (not shown). In some instances, a screen (not shown) may be included upstream of the compressor 128 to remove larger material.

To maintain a reactor temperature, the temperature of the recycle gas 114 may be continuously adjusted up or down to accommodate any changes in the rate of heat generation due to the polymerization. One or more temperature sensors 134 may be located in the fluidized bed, and used with a control system and the cooling loop to control the temperature $T_{rx}$ of the fluidized bed 112 near the process set-point. Heated reactor gas 136, which carries heat energy from the fluidized bed reactor 102, is withdrawn from the outlet 132 and is pumped by the compressor 128 to the cooler 126 wherein the temperature of the heated reactor gases 136 is reduced and at least some of the ICA present are condensed to a liquid The recycle gas 114 from the cooler 126, including any condensed liquids, flows to the reactor inlet 130 to cool the fluidized bed 112. Temperature sensors (not shown) near the inlet and outlet of the cooler 126 may provide feedback to a control system (FIG. 1B) to regulate the amount by which cooler 126 reduces the temperature of the recycle gas 114 entering the fluidized bed reactor 102.

The fluidized bed reactor 102 may also include skin temperature sensors 135, mounted in positions along a wall of the straight section 108 of the fluidized bed reactor 102 so as to protrude into the bed from the reactor wall by a small amount (e.g., about one eighth to one quarter of an inch). The skin temperature sensors 135 may be configured and positioned to sense the temperature $T_w$ of the resin near the wall of the fluidized bed reactor 102 during operation.

The temperature sensors 134 in the fluidized bed 112 can include a resistance temperature sensor positioned and configured to sense bed temperature during reactor operation at a location within the fluidized bed reactor 102 away from the reactor wall. The resistance temperature sensor can be mounted so as to protrude into the bed more deeply than the skin temperature sensors 135 (e.g., about 8 to 18 inches away from the reactor wall).

Other sensors and other apparatuses may be employed to measure other reaction parameters during a polymerization reaction. The reaction parameters may include instantaneous and bed-averaged resin product properties (e.g., melt index and density of the polymer resin product being produced by the polymerization system 100 during a polymerization reaction). Resin product properties are conventionally measured by periodically sampling the resin as it exits the reactor (e.g., about once per hour), and performing the appropriate tests in a quality control laboratory.

Other measured reaction parameters may include reactor gas composition (e.g., concentrations and partial pressures of reactant gases, ICA, inert gases, and isomers of other materials, such as nitrogen, inert hydrocarbon, and the like). The reactor gas composition may be measured with a gas chromatograph system 138.

The process control variables may be controlled to obtain the desired catalyst productivity for the polymerization system 100 and properties for the resin. For example, the parameters used to control gas phase composition within the fluidized bed reactor 102 can include the concentration and composition of the ICA and comonomer, the partial pressure of monomer, and the type and properties of catalysts, and the temperature of the reaction process. For example, it is known that a polymerization reaction during a transition may be controlled by controlling process control variables to ensure that the product (e.g., the granular resin) has properties compliant with an initial specification set at the start of the transition, the product produced during the transition ceases to comply with the initial specification set at a first time, and the product has properties compliant with a final specification set at the end of the transition.

Figure 1B:
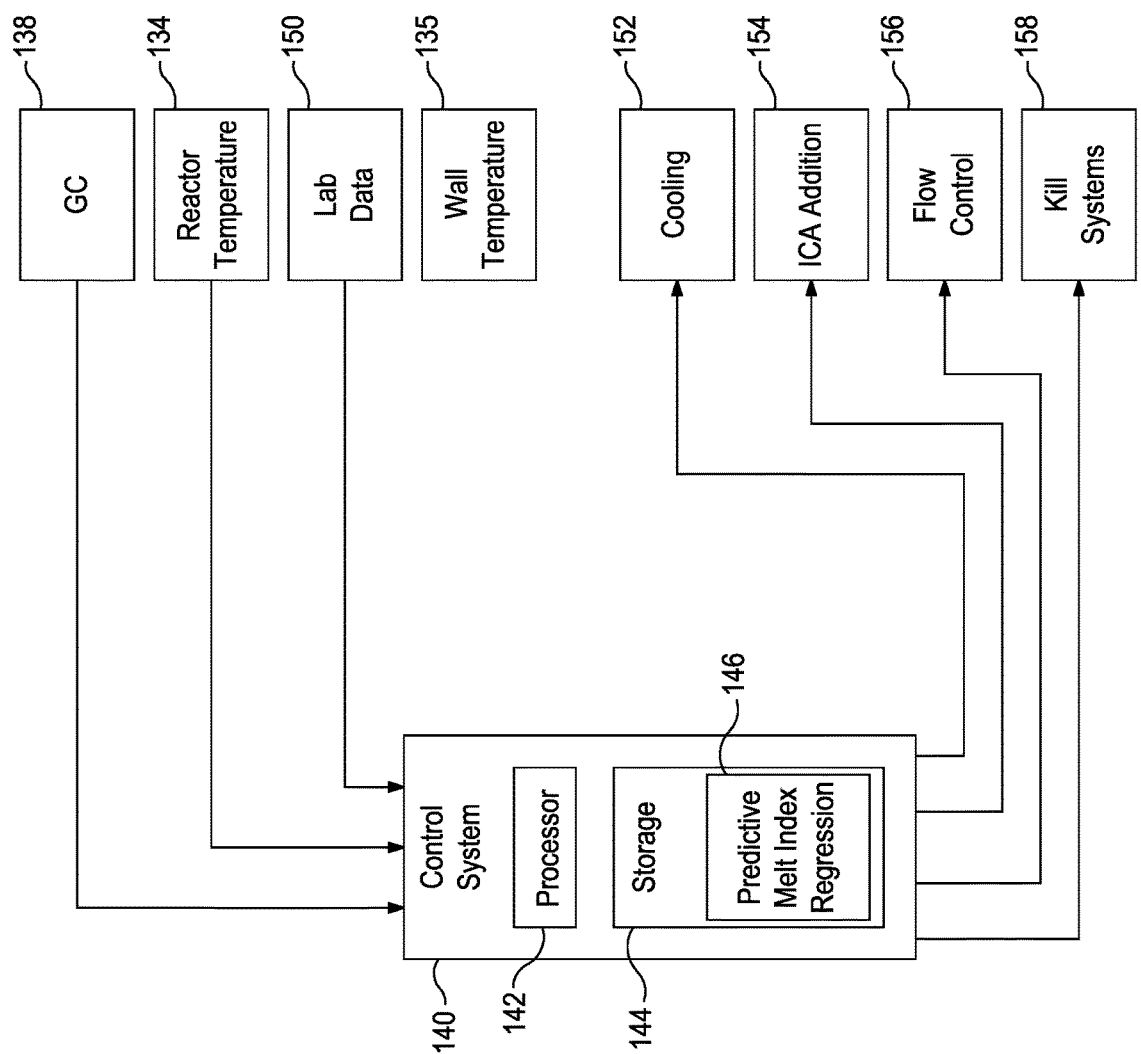
FIG. 1B is a block diagram of a control system that can be used to control the polymerization system in accordance with some of the embodiments described herein.

FIG. 1B is a block diagram of a control system 140 that can be used to control the polymerization system 100. The control system 140 may be a distributed control system (DCS), a direct digital controller (DDC), a programmable logic controller (PLC), or any other suitable system or combination of systems. The control system 140 has a processor 142 that implements machine readable instructions from a storage system 144. Illustrative processors may include a single core processor, a multiple core processor, a virtual processor, a virtual processor in a cloud implementation, an application specific integrated circuit (ASIC), or any combination of these systems. Illustrative storage systems 144 can include random access memory (RAM), read only memory (ROM), hard drives, virtual hard drives, RAM drives, cloud storage systems, optical storage systems, physically encoded instructions (for example, in an ASIC), or any combination of these systems.

The storage system 144 may include a predictive melt index regression 146 to generate control settings for the polymerization system 100. Adjustments to control settings may be determined based on the output of temperature sensors 134 and 132, the composition of the gas phase as determined by the GC 138, and lab data 150, among others. After determining new control settings, the control system 140 may make or recommend adjustments, for example, to the process cooling systems 152, the ICA addition and recycling systems 154, flow control systems 156, and kill systems 158, among others. Thus, the control variables may be used in concert with the predictive melt index regression 146 described herein to adjust reactor parameters to keep the reactor operations in a safe operating regime and produce a polyolefin with a desired melt index.

The methods described herein allow for monitoring, maintaining, adjusting, and the like the conditions in the polymerization system 100 to produce a polyolefin with the desired melt index. These methods use available process and resin property data, and can be implemented at plant sites either on-line, in process control systems, or off-line (e.g., using spreadsheets, data bases, or application specific programs).

Adjustments to control settings may be determined based on the output with the predictive melt index regression 146 described herein, which depends on the gas phase composition and the catalyst concentration in the polymerization system 100. After determining new control settings, the control system 140 may make, or recommend, adjustments, for example, to the process cooling systems 152, the ICA addition and recycling systems 154, flow control systems 156, and kill systems 158, among others.

One skilled in the art would readily recognize that the reactor and associated methods may be an element of a staged reactor employing two or more reactors in series, wherein one reactor may produce, for example, a high molecular weight polyolefin and another reactor may produce a low molecular weight polyolefin.

Predictive Melt Index Regression and Polyolefin Production Methods

Polyolefin polymerization may be performed by contacting in a reactor (e.g., fluidized bed reactor 102 of FIG. 1A) an olefin monomer and optionally a comonomer with a catalyst system in the presence of ICA and optionally hydrogen. The individual flow rates of olefin monomer, optional comonomer, optional hydrogen, and ICA (or components thereof) may be controlled to maintain fixed gas composition targets. The concentration of all gases may be measured with a chromatograph. A solid catalyst, a catalyst slurry, or liquid solution of the catalyst may be injected directly into the reactor using, for example, a carrier fluid (e.g., purified nitrogen) or a mixture of carrier fluid and ICA, where the feed rate of catalyst may be adjusted to change or maintain the catalyst inventory in the reactor.

Surprisingly, it has been discovered that the melt index of the polyolefin is greatly influenced by the concentration of ICA (i.e., a mole percent of ICA relative to total reactor gas, which may be derived from the partial pressure of each relative to the total pressure in the reactor) in the reactor. The predictive melt index regression described herein takes the ICA partial pressure into account.

The predictive melt index regression described herein relates melt index of the polyolefin to the composition of the gas phase (i.e., the concentration of the ICA, the concentration of the hydrogen (when present), the concentration of the olefin monomer, and the concentration of the comonomer (when present)) and the concentration of the catalyst in reactor. In embodiments, the predictive melt index regression described herein could include additional terms, for example, relating melt index of the polyolefin to reactor temperature and polyolefin residence time.

The predictive melt index regression may be calculated as a best fit line for the polyolefin melt index over time as a function of the composition of the gas phase and the concentration of catalyst in reactor, or additional factors if included. Such best fit lines may have any suitable mathematical representation. For example, the Examples Section of the present disclosure provides an exponential function as the best fit line.

Each of the terms of the predictive melt index regression may be based on any known or standard way in which each term is monitored. For example, the concentration of ICA may be monitored as ICA partial pressure ($ICA_{PP}$) or as a ratio of ICA to another component. Additionally, the concentration of the hydrogen (when present), the concentration of the olefin monomer, and the concentration of the comonomer (when present) may be monitored as ratios of visible percent of total reactor gas for each (e.g., a mole percent of total reactor gas ratio of the olefin monomer and the comonomer ($olefin_{mol}$:$comonomer_{mol}$) and a mole percent of total reactor gas ratio of the hydrogen and the olefin monomer ($H2_{mol}$:olefin$_{mol}$). While the foregoing are general ways the composition of the gas phase in the reactor may be monitored and reported, the actual terms in the predictive melt index regression may be different provided that the concentration of the ICA, the concentration of the hydrogen (when present), the concentration of the olefin monomer, and the concentration of the comonomer (when present) are accounted for in the predictive melt index regression. Additionally, when the use of a ratio of components is discussed or claimed herein (e.g. olefin$_{mol}$:comonomer$_{mol}$), the inverse of the ratio may also be used and should be considered as included within the scope of a the relevant claim (e.g. comonomer$_{mol}$:olefin$_{mol}$).

Generally, one or more of the terms in the predictive melt index regression that relate to the gas phase composition may include a time constant based on a smoothing function to account for a response time of the polyolefin melt index to changes in the value of the term while also smoothing out the impact of instantaneous variations. In addition to the polyolefin melt index being influenced by the ICA concentration, the time constant associated therewith with may be quite long. Additionally, the time constant associated with the hydrogen, when present, may be a relatively short time constant of less than about 5 minutes.

Exemplary smoothing functions may be an exponential smoothing function, a moving average smoothing function, a weighted average smoothing function, an exponential moving average smoothing function, and the like.

Time constants may be determined by analyzing the degree of fit (measured by the known statistical coefficient $r^2$) as a function of the time constant. In some instances, the time constant may be the time associated with achieving stabilization of the $r^2$ coefficient (e.g., changes by less than about 1% over 1 minute). In some instances, the time constant may be the time associated with achieving an $r^2$ coefficient of about 0.75 or greater, about 0.8 or greater, or more preferably about 0.9 or greater.

In some instances, a term associated with the ICA concentration, such as an ICA term, may include a time constant (ICA$_{PP}$ time constant) of about 50 minutes or greater. In some instances, a term associated with the ICA concentration, such as an the ICA term, may be associated with a time constant of about 50 minutes to about 300 minutes, about 100 minutes to about 300 minutes, about 100 minutes to about 250 minutes, or about 150 minutes to about 250 minutes.

In some instances, a term associated with the hydrogen concentration (when used), such as the $H2_{mol}$:olefin$_{mol}$ term, may include a time constant ($H2_{mol}$:olefin$_{mol}$ time constant) of about 5 minutes or less. In some instances, a term associated with the hydrogen concentration (when used), such as the $H2_{mol}$:olefin$_{mol}$ term, may be associated with a time constant of about 10 seconds to about 5 minutes, about 30 seconds to about 5 minutes, about 1 minutes to about 5 minutes, about 10 seconds to about 3 minutes, or about 30 seconds to about 3 minutes.

In some instances, a term associated with the comonomer concentration, such as the olefin$_{mol}$:comonomer$_{mol}$ term, may include a time constant (olefin$_{mol}$:comonomer$_{mol}$ time constant) of about 5 minutes or greater. In some instances, a term associated with the comonomer concentration, such as the the olefin$_{mol}$:comonomer$_{mol}$ term, may be associated with a time constant of about 5 minutes to about 300 minutes, about 50 minutes to about 300 minutes, about 100 minutes to about 300 minutes, about 100 minutes to about 250 minutes, or about 150 minutes to about 250 minutes.

In some instances, a term associated with the measurement equipment involved in a polymerization system or process may be included and may also be associated with a time constant. For example, gas analysis equipment such as an on-line gas chromatograph may have a time constant due to the time required for the gaseous components to travel to the gas chromatograph detector and the time required to carry out on-line analysis. In some instances, a term associated with the measurement equipment, such as the gas chromatograph, may be associated with a time constant of about 30 seconds to about 20 minutes, about 30 seconds to about 15 minutes, about 30 seconds to about 10 minutes, or about 30 seconds to about 5 minutes.

As describe above, the predictive melt index regression may further include a term that relates to the catalyst concentration in the reactor, which may be particularly useful for producing bimodal polyethylene polymers made from two different catalysts. In some instances, the catalyst may include only a single catalyst component. In some instances, the catalyst may include two or more components where the associated term in the predictive melt index regression includes relative concentrations of the catalyst components. For example, a catalyst for producing bimodal molecular weight polyolefin may include a two component catalyst, specifically a low molecular weight (LMW) catalyst and a high molecular weight (HMW) catalyst. In some instances, the term in the predictive melt index regression associated with the catalyst concentration may include a ratio, such as a mole ratio, of the two components in the reactor (HMW$_{mol}$:LMW$_{mol}$). In some instances, catalyst systems with two components may be introduced as a catalyst stream and a trim stream, for example as described in U.S. Pat. Nos. 8,318,872 and 6,608,149. In some instances, the catalyst stream may include both the HMW catalyst and the LMW catalyst, and the trim stream may include only one of the HMW catalyst or the LMW catalyst. The trim stream may be used to modulate the HMW$_{mol}$:LMW$_{mol}$. Accordingly, the term in the predictive melt index regression that relates to the catalyst concentration in the reactor may be represented by the relative flow rates of the catalyst stream and the trim stream when the system is operating at or near steady state.

During production of the polyolefin, the gas phase composition and the catalyst concentration may be monitored and input into the predictive melt index regression to produce the predicted melt index. The gas phase composition and the catalyst concentration may then be adjusted to maintain or return the melt index of the produced polyolefin to within a melt index within a melt index threshold range (i.e., the preferred upper and lower limits of the melt index).

In some embodiments, a predictive melt index regression may be determined based on at least one previously performed polyolefin production run. After determination of the predictive melt index regression, the second polyolefin may be produced where the gas phase composition and the catalyst concentration are monitored and input into the predictive melt index regression. Then, the gas phase composition and the catalyst concentration may be adjusted to maintain or return the melt index of the produced polyolefin to within a melt index within a melt index threshold range.

In some embodiments, a predictive melt index regression may be determined on-the-fly where the gas phase composition, the catalyst concentration, and the melt index of the polyolefin product are measured and the predictive melt index regression (i.e., the best fit line) is determined during polyolefin production. Determining or calculating the predictive melt index regression on-the-fly should generally occur at a time during the polyolefin production to accommodate the time constants of the terms associated with ICA concentration and olefin$_{mol}$:comonomer$_{mol}$.

In some embodiments, the partial pressure of ICA in the reactor may be up to about 200 psi (1379 kPa), about 5 psi (34 kPa) to about 150 psi (1034 kPa), or about 20 psi (138 kPa) about 100 psi (689 kPa).

In some embodiments, the olefin monomer partial pressure may be at up to about 600 psi (4138 kPa), about 100 psi (690 kPa) to about 600 psi (4138 kPa), about 100 psi (1379 kPa) to about 400 psi (2759 kPa), or about 150 psi (1724 kPa) to about 250 psi (2414 kPa).

When present, the comonomer may be at any relative concentration to the olefin monomer that will achieve the desired weight percent incorporation of the comonomer into the finished polyolefin. In some embodiments, the comonomer may be present with the olefin monomer in a mole ratio range in the gas phase of from about 0.0001 to about 50 (comonomer to olefin monomer), from about 0.0001 to about 5 in another embodiment, from about 0.0005 to about 1.0 in yet another embodiment, and from about 0.001 to about 0.5 in yet another embodiment.

The olefin monomer or comonomers, for example, may contain from 2 to 18 carbon atoms in some embodiments. In another embodiment, the olefin monomer may be ethylene, and a comonomer may comprise from 3 to 12 carbon atoms. In yet another embodiment, the olefin monomer may be ethylene or propylene, and a comonomer may comprise from 4 to 10 carbon atoms. In another embodiment, the olefin monomer may be ethylene or propylene, and a comonomer may comprise from 4 to 8 carbon atoms. Exemplary alpha-olefins that may be utilized as a comonomer in embodiments describe herein may include, but are not limited to, ethylene, propylene, 1-butene, 1-pentene, 1-hexene, 1-heptene, 1-octene, 4-methylpent-1-ene, 1-decene, 1-dodecene, 1-hexadecene, and the like, and any combination thereof. Additionally, a polyene may be used as a comonomer according to some embodiments described herein. Exemplary polyenes may include, but are not limited to, such as 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and olefins formed in situ in the polymerization medium. When olefins are formed in situ in the polymerization medium, the formation of polyolefins containing long chain branching may occur. Additional examples of comonomers may include isoprene, styrene, butadiene, isobutylene, chloroprene, acrylonitrile, and cyclic olefins. Combinations of the foregoing may be utilized in the methods described herein.

Examples of polymers that can be produced in accordance with the method described herein may include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more $C_2$-$C_{18}$ alpha olefin; and terpolymers of one or more $C_2$-$C_{18}$ alpha olefins with a diene. In some embodiments, the polyolefin produced by the method described herein may include olefin homopolymers (e.g., homopolymers of ethylene or propylene). In some instances, the polyolefin produced may be copolymers, terpolymers, and the like of the olefin monomer and the comonomer. In some embodiments, the polyolefin produced may be a polyethylene or a polypropylene. Exemplary polyethylenes produced by the methods described herein may be homopolymers of ethylene or interpolymers of ethylene and at least one alpha-olefin (comonomer) wherein the ethylene content may be at least about 50% by weight of the total monomers involved. Exemplary polypropylenes produced by the methods described herein may be homopolymers of propylene or interpolymers of propylene and at least one alpha-olefin (comonomer) wherein the propylene content may be at least about 50% by weight of the total monomers involved.

The amount of hydrogen used in some polymerization processes is an amount necessary to achieve the desired melt index (or molecular weight) of the final polyolefin resin. In some embodiments, the H2$_{mol}$:monomer$_{mol}$ may be greater than about 0.00001, greater than about 0.0005, greater than about 0.001, less than about 10, less than about 5, less than about 3, or less than about 0.10, wherein a desirable range may comprise any combination of any upper mole ratio limit with any lower mole ratio limit described herein. Expressed another way, the amount of hydrogen in the reactor at any time may range to up to about 10 ppm in some embodiments, up to about 100 or about 3000 or about 4000 or about 5000 ppm in other embodiments, between about 10 ppm and about 5000 ppm in yet another embodiment, or between about 500 ppm and about 2000 ppm in another embodiment.

Exemplary catalysts suitable for use in the embodiments described herein may include, but are not limited to, Ziegler Natta catalysts, chromium based catalysts, vanadium based catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium. A single catalyst may be used, or a mixture of catalysts may be employed, if desired. The catalyst may be soluble or insoluble, supported or unsupported. Further, the catalyst may be a prepolymer, spray dried with or without a filler, a liquid, or a solution, slurry/suspension, or dispersion.

Metallocenes as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. As used herein, these compounds may be referred to as "metallocenes" or "metallocene catalyst components." The metallocene catalyst component may be supported on a support material, and may be supported with or without another catalyst component. In some embodiments, the one or more metallocene catalyst components are represented by the formula (I):

$$Cp^A Cp^B MX_n \qquad (I)$$

wherein M is a metal atom selected from the group consisting of Groups 3 through 12 atoms and lanthanide Group atoms in some embodiments. For example, M may be selected from Ti, Zr, Hf atoms. Each leaving group X is chemically bonded to M; each Cp group is chemically bonded to M; and n is 0 or an integer from 1 to 4, and may be either 1 or 2 in a particular embodiment.

The Cp ligands may be one or more rings or ring systems, at least a portion of which includes Π-bonded systems, such as cycloalkadienyl ligands and heterocyclic analogues. The Cp ligands are distinct from the leaving groups bound to the catalyst compound in that they are not highly susceptible to substitution or abstraction reactions. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by at least one R group. Non-limiting examples of substituent R groups include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, $Cp^A$ and $Cp^B$ are independently selected from the group consisting of cyclopentadienyl, indenyl, tetrahydroindenyl, fluorenyl, and substituted derivatives of each. As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls may include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, acylamino radicals, and combinations thereof.

In some embodiments, each leaving group X in the formula (I) above may be independently selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, and substituted derivatives thereof. As used herein, the phrase "leaving group" refers to one or more chemical moieties bound to the metal center of the catalyst component, which can be abstracted from the catalyst component by an activator, thus producing a species active towards olefin polymerization or oligomerization.

The structure of the metallocene catalyst component may take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213. Others include those catalysts described in U.S. Patent Application Publication Nos. US2005/0124487A1, US2005/0164875A1, and US2005/0148744. In some embodiments, the metallocene may be formed with a hafnium metal atom (e.g., bis(n-propylcyclopentadienyl) hafnium $X_n$, bis(n-butylcyclopentadienyl) hafnium Xn, or bis(n-pentylcyclopentadienyl) hafnium $X_n$, where X is one of chloride or fluoride and n is 2), such as is described in U.S. Pat. Nos. 6,242,545 and 7,157,531.

In certain embodiments, the metallocene catalysts components described above may include their structural or optical or enantiomeric isomers (racemic mixture), and, in some embodiments, may be a pure enantiomer.

In some embodiments, the catalyst may be a metallocene catalyst in the absence of, or essentially free of, any scavengers (e.g., triethylaluminum, trimethylaluminum, triisobutylaluminum, tri-n-hexylaluminum, diethyl aluminum chloride, dibutyl zinc and the like). By "essentially free," it is meant that these compounds are not deliberately added to the reactor or any reactor components, and if present, are present in less than about 1 ppm in the reactor.

In some embodiments, the catalyst system may be a bimodal catalyst system. An exemplary bimodal catalyst system may include a (1) Group 15 and metal containing catalyst compound (preferably "bis(arylamido)Zr dibenzyl", where Zr denotes zirconium) for catalyzing polymerization of a HMW fraction of the product and (2) a metallocene catalyst component (preferably including ligands bonded to zirconium dichloride or zirconium dimethyl) for catalyzing polymerization of a LMW fraction of the product.

In some embodiments, the catalysts may be used with cocatalysts and promoters (e.g., alkylaluminums, alkylaluminum halides, alkylaluminum hydrides, and aluminoxanes).

In some instances, the one or more catalysts may be combined with up to about 10 wt % of one of more antistatic agents as are known in the art, such as a metal-fatty acid compound (e.g., an aluminum stearate), based upon the weight of the catalyst system (or its components). Other metals that may be suitable include other Group 2 and Group 5-13 metals. One or more antistatic agents may be added directly to the reactor system as well.

In some instances, supported catalyst(s) may be combined with activators by tumbling and/or other suitable means, optionally with up to about 2.5 wt % (by weight of the catalyst composition) of an antistatic agent. Exemplary antistatic agent may include, but are not limited to, an ethoxylated or methoxylated amine (e.g., KEMAMINE AS-990, available from ICI Specialties) and polysulfone copolymers in the OCTASTAT family of compounds, more specifically Octastat 2000, 3000, and 5000 (available from Octel).

In some embodiments, the antistatic agent may be mixed with the catalyst and fed into the reactor. In other embodiments, the antistatic agent may be fed into the reactor separate from the catalyst. One advantage of this method of addition is that it permits on-line adjustment of the level of the additive. The antistatic agents may individually be in a solution, slurry, or as a solid (preferably as a powder) before introduction into the reactor.

In various embodiments, a polymerization reaction according to the methods described herein may optionally employ other additives, such as inert particulate particles.

In some embodiments, the polymerization reaction temperature may be about 30° C. to about 120° C., about 60° C. to about 115° C., about 70° C. to about 110° C., or about 70° C. to about 105° C.

In some embodiments, the polymerization reaction may be performed at a reactor pressure of up to about 600 psi (4138 kPa), about 100 psi (690 kPa) to about 600 psi (4138 kPa), about 200 psi (1379 kPa) to about 400 psi (2759 kPa), or about 250 psi (1724 kPa) to about 350 psi (2414 kPa).

Embodiments disclosed herein include Embodiment A, Embodiment B, and Embodiment C.

Embodiment A

A method that includes providing a predictive melt index regression derived at least in part on data from a previous production run of a first polyolefin having a first melt index formed by reacting an olefin monomer with a catalyst system in the presence of an induced condensing agent (ICA) and optionally hydrogen, wherein the predictive melt index regression includes terms based on an effect of a concentration of the ICA in the reactor and optionally an effect of a concentration of hydrogen in the reactor on the melt index of the first polyolefin, wherein at least one term of the predictive melt index regression associated with the concentration of the ICA or the concentration of the hydrogen is independently represented by a smoothing function that incorporates a time constant; contacting in a fluidized bed gas phase reactor the olefin monomer with the catalyst system in the presence of the ICA and optionally hydrogen to produce a second polyolefin having a second melt index; monitoring a reactor ICA concentration and optionally a reactor hydrogen concentration; calculating a predicted melt index for the second polyolefin using the predictive melt index regression based on a change to the reactor ICA concentration; and adjusting the reactor ICA concentration based on the predicted melt index to maintain the second melt index within or move the second melt index to within a melt index threshold range.

Embodiment B

A method that includes providing a predictive melt index regression derived at least in part on data from a previous production run of a first polyolefin having a first melt index formed by reacting an olefin monomer and at least one comonomer with a catalyst system in the presence of an induced condensing agent (ICA) and optionally hydrogen, wherein the predictive melt index regression includes terms based on an effect of a concentration of the ICA in the reactor, an effect of a concentration of the comonomer in the reactor, and optionally an effect of a concentration of hydrogen in the reactor on the melt index of the first polyolefin, and wherein at least one term of the predictive melt index regression associated with the concentration of the ICA, the concentration of the comonomer, or the concentration of the hydrogen is independently represented by a smoothing function that incorporates a time constant; contacting in a fluidized bed gas phase reactor the olefin monomer and the at least one comonomer with the catalyst system in the presence of the ICA and optionally hydrogen to produce a second polyolefin having a second melt index; monitoring a reactor ICA concentration and optionally a reactor hydrogen concentration; calculating a predicted melt index for the second polyolefin using the predictive melt index regression based on a change to the reactor ICA concentration; and adjusting the reactor ICA concentration based on the predicted melt index to maintain the second melt index within or move the second melt index to within a melt index threshold range.

Embodiment C

A method that includes contacting in the fluidized bed gas phase reactor the olefin monomer and at least one comonomer with the catalyst system in the presence of the ICA and optionally the hydrogen to produce the polyolefin; monitoring a concentration of the comonomer in the reactor; calculating the predictive melt index regression further based on an effect of the concentration of the comonomer in the reactor on the melt index of the polyolefin, wherein at least one term of the predictive melt index regression associated with the concentration of the comonomer is a smoothing function that incorporates a time constant.

Embodiments A, B, and C may have one or more of the following additional elements in any combination: Element 1: wherein terms of the predictive melt index regression associated with the concentration of the ICA and the concentration of the hydrogen independently include a smoothing function that incorporates a time constant; Element 2: wherein the catalyst system includes a high molecular weight (HMW) catalyst and a low molecular weight (LMW) catalyst, wherein the method further includes: monitoring a mole ratio of the HMW catalyst and the LMW catalyst ($HMW_{mol}$:$LMW_{mol}$) in the reactor, and calculating the predictive melt index regression further based on an effect of the $HMW_{mol}$:$LMW_{mol}$ on the melt index of the polyolefin; Element 3: wherein the time constant associated with the concentration of the ICA is about 50 minutes or greater; Element 4: wherein the time constant associated with the concentration of the ICA is about 100 minutes to about 300 minutes; Element 5: wherein the smoothing function is an exponential smoothing function; Element 6: wherein the predictive melt index regression is an exponential function; Element 7: wherein the concentration of the ICA is represented by a partial pressure of the ICA ($ICA_{pp}$); Element 8: wherein the concentration of the hydrogen is represented by a mole percent of total reactor gas ratio of the hydrogen to the olefin monomer ($H2_{mol}$:$olefin_{mol}$); Element 9: wherein the concentration of the comonomer is represented by a mole percent of total reactor gas ratio of the olefin monomer and the at least one comonomer ($olefin_{mol}$:$comonomer_{mol}$); Element 10: wherein the predictive melt index regression includes at least one additional term associated with reactor temperature or polymer residence time.

By way of non-limiting example, exemplary combinations applicable to Embodiments A, B, and C include: Element 1 in combination with Element 2; Element 1 in combination with Element 3; Element 4 in combination with Element 2; Element 4 in combination with Element 3; Element 5 in combination with Element 2; Element 5 in combination with Element 3; and element 4 in combination with Element 5 and optionally in further combination with Element 1.

Embodiment B may also optionally incorporate Element 6: wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin, which may optionally be in combination with one of Elements 1-5 or one of the foregoing combinations of Elements 1-5.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Figure 2:
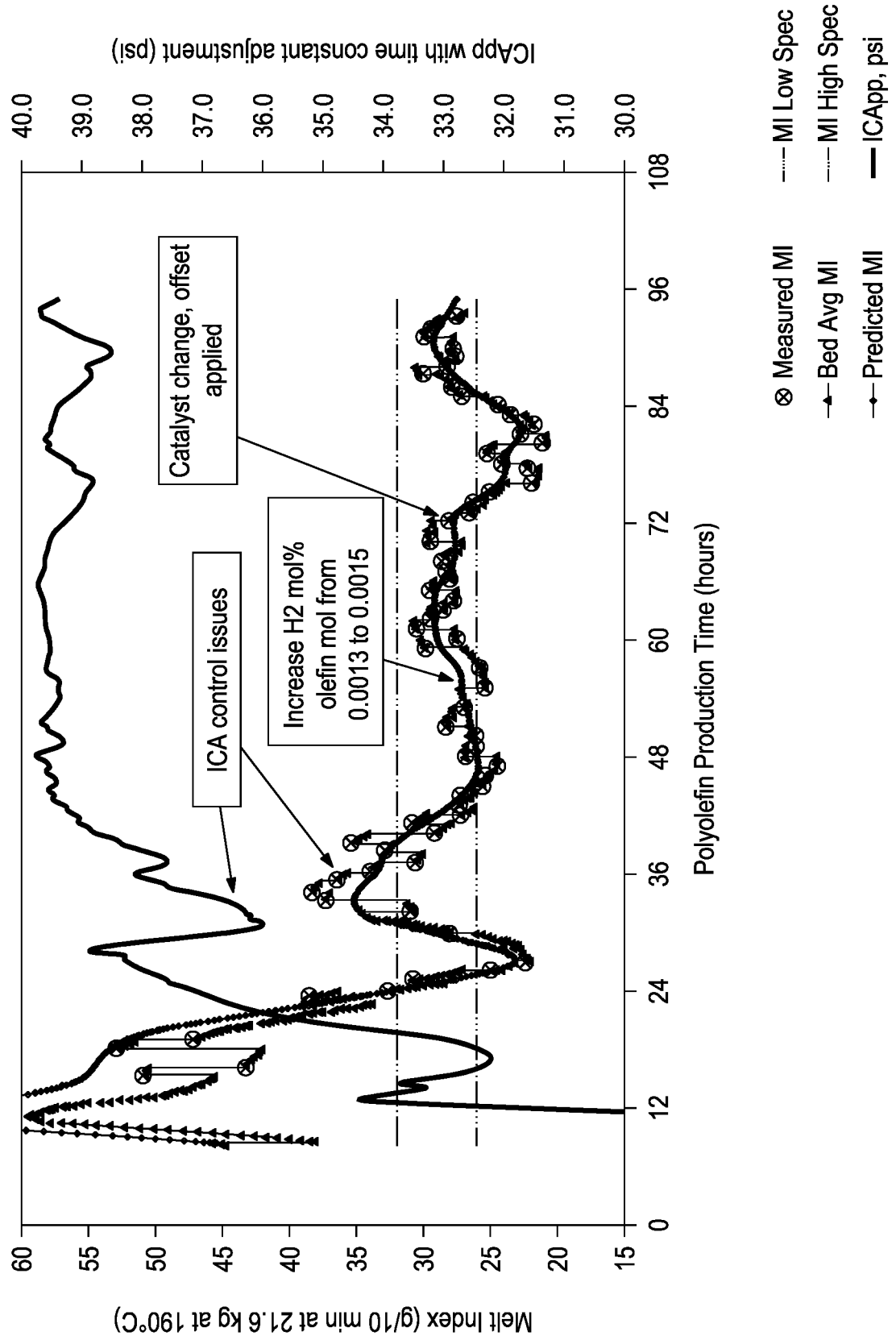
FIG. 2 provides an overlay plot of several melt index analyses as a function of polyolefin production time FIG. 3 provides a plot of the sum of square and residual sum of squares ($r^2$) for various ICA time constants.

Data from a polyethylene production run using a bimodal catalyst system that included a (1) bis(arylamido)Zr dibenzl (HMW catalyst) and (2) a zirconium metallocene catalyst (LMW catalyst), a comonomer of hexene, and an ICA of isopentane. FIG. 2 provides an overlay plot of several melt index analyses as a function of polyolefin production time. The melt index analyses includes the lab measured melt index of the produced polyolefin, the bed average melt index, and the predicted melt index from the calculated predictive melt index regression. It should be noted that the plots for bed average melt index and the predicted melt index overlap significantly, especially from about 30 to 86 hours, which illustrates the accuracy of the predictive melt index regression. The plot in FIG. 2 further includes a melt index threshold range at 26 g/10 min to 32 g/10 min at 21.6 kg at 190° C. FIG. 2 also includes labels for various changes in the reaction parameters (e.g., an ICA control issue, an increase in $H2_{mol}$:olefin$_{mol}$, and a catalyst change).

The predictive melt index regression was based on an exponential best fit with a general formula according to Equation 1.

$$FI = e^{\{A + C[H2_{mol}:C2_{mol}] + D[C6_{mol}:C2_{mol}] + E(ICAPP)\}} * (HMW_{mol}:LMW_{mol})^B \quad \text{Equation 1}$$

where: A is the intercept determined from the best fit line;
B-E are slope terms determined from the best fit line;
$H2_{mol}:C2_{mol}$, $C6_{mol}:C2_{mol}$, and ICA are represented by smoothing functions with time constants; and
e is an exponential function exp( ) corresponding natural log In this example, Equation 2 was used as the smoothing function with a time constant incorporated therein.

$$y_c + (y_p - y_c) * e^{\left(-\frac{d_t}{t_c}\right)} \quad \text{Equation 2}$$

where: $y_c$ is the current instantaneous value;
$y_p$ is the previous value adjusted by time constant;
$d_t$ is the change in time between the last update (min); and
$t_c$ is the time constant (min)

Figure 3:
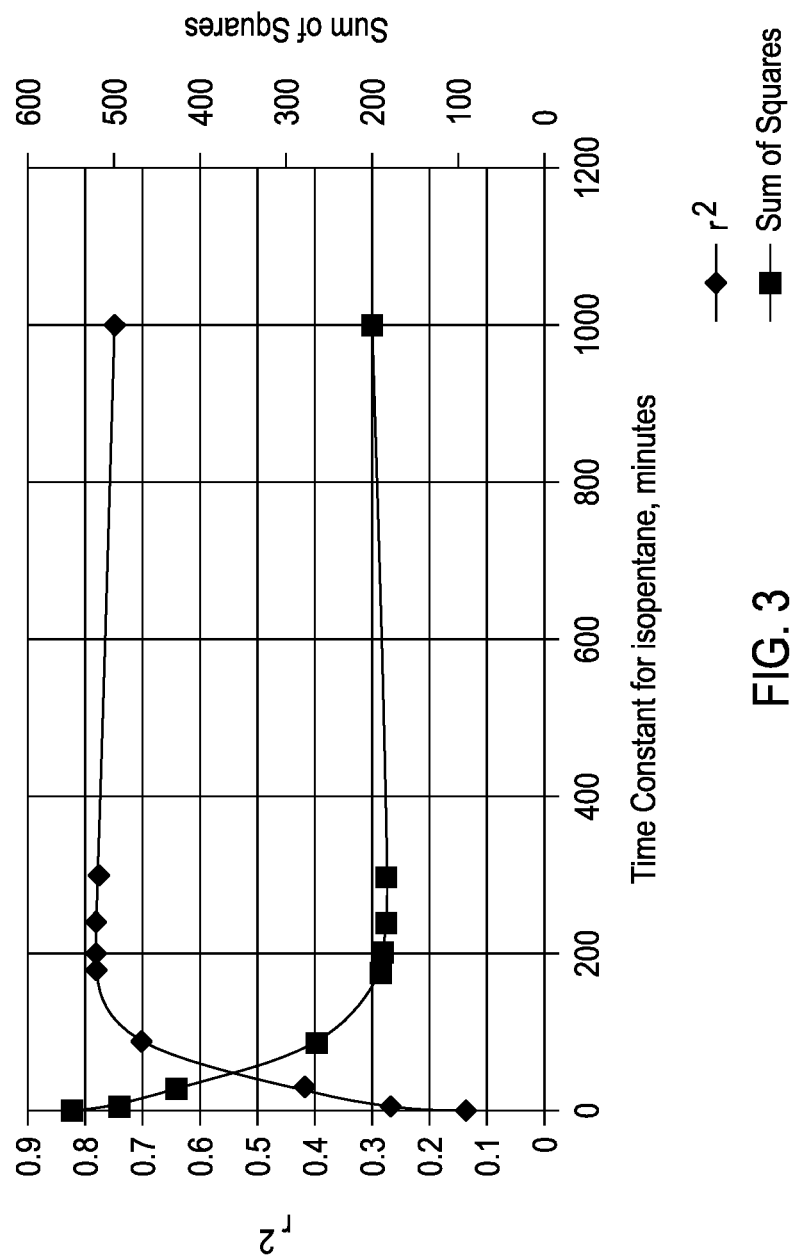

The sum of square and residual sum of squares ($r^2$) of Equation 2 was plotted with various time constants for each term. FIG. 3 provides such a plot for the time constant value for the ICA concentration term (represented by ICA in Equation 1). As illustrated, the greatest $r^2$ value is at a time constant value of about 230 minutes, which was then used as the time constant for the ICA concentration term in the predictive melt index regression (Equation 1). In this example, the time constants were calculated as follows: $H2_{mol}:C2_{mol}$ is about 1 minute, $C6_{mol}:C2_{mol}$ is about 200 minutes, and ICA is about 230 minutes. The coefficients for the various terms determined based on the best fit line according to Equation 1 were as follows: A is about 8.0, B is about −2.4, C is about 474, D is about −462, and E is about −0.1.

FIG. 2 also includes a plot of ICA with time constant adjustment as a function of polyolefin production time.

This example demonstrates that a predictive melt index regression can be calculated and that the effect of ICA concentration on polyolefin melt index is associated with a long time constant (especially in comparison to the $H2_{mol}$: $C2_{mol}$ time constant).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
contacting in a fluidized bed gas phase reactor an olefin monomer with a catalyst system in the presence of an induced condensing agent (ICA) and optionally hydrogen to produce a polyolefin having a melt index;
monitoring a reactor ICA concentration, optionally a reactor hydrogen concentration, and the melt index of the polyolefin;
calculating a predictive melt index regression based on an effect of the concentration of the ICA in the reactor and optionally an effect of the hydrogen in the reactor on the melt index of the polyolefin, wherein at least one term of the predictive melt index regression associated with the concentration of the ICA or the concentration of the hydrogen is independently represented by a smoothing function that incorporates a time constant;
calculating a predicted melt index using the predictive melt index regression based on a change in the reactor ICA concentration; and
adjusting the reactor ICA concentration based on the predicted melt flow index to maintain the melt index within or move the melt index to within a melt index threshold range.

2. The method of claim 1, wherein terms of the predictive melt index regression associated with the concentration of the ICA and the concentration of the hydrogen are each independently represented by a smoothing function that incorporates a time constant.

3. The method of claim 1, further comprising:
contacting in the fluidized bed gas phase reactor the olefin monomer and at least one comonomer with the catalyst system in the presence the ICA and optionally hydrogen to produce the polyolefin; and
monitoring a mole percent of total reactor gas ratio of the olefin monomer and the at least one comonomer ($olefin_{mol}$:$comonomer_{mol}$);
calculating the predictive melt index regression further based on an effect of the $olefin_{mol}$:$comonomer_{mol}$ on the melt index of the polyolefin where a term of the predictive melt index regression associated with the $olefin_{mol}$:$comonomer_{mol}$ is a smoothing function that incorporates a time constant.

4. The method of claim 1, wherein the catalyst system includes a high molecular weight (HMW) catalyst and a low molecular weight (LMW) catalyst, wherein the method further includes:
monitoring a mole ratio of the HMW catalyst and the LMW catalyst ($HMW_{mol}$:$LMW_{mol}$) in the reactor, and
calculating the predictive melt index regression further based on an effect of the $HMW_{mol}$:$LMW_{mol}$ on the melt index of the polyolefin.

5. The method of claim 1, further comprising adjusting the mole ratio of the HMW catalyst and the LMW catalyst ($HMW_{mol}$:$LMW_{mol}$) in the reactor based on the predicted melt index.

6. The method of claim 1, wherein the time constant associated with the concentration of the ICA is about 50 minutes or greater.

7. The method of claim 1, wherein the time constant associated with the concentration of the ICA is about 100 minutes to about 300 minutes.

8. The method of claim 1, wherein the smoothing function is an exponential smoothing function.

9. The method of claim 1, wherein the predictive melt index regression is an exponential function.

10. The method of claim 1, wherein the concentration of the ICA is represented by a partial pressure of the ICA ($ICA_{PP}$).

11. The method of claim 1, wherein the concentration of the hydrogen is represented by a mole percent of total reactor gas ratio of the hydrogen to the olefin monomer ($H2_{mol}$:$olefin_{mol}$).

12. The method of claim 1, wherein the concentration of the comonomer is represented by a mole percent of total reactor gas ratio of the olefin monomer and the at least one comonomer ($olefin_{mol}$:$comonomer_{mol}$).

13. The method of claim 1, wherein the predictive melt index regression includes at least one additional term associated with reactor temperature or polymer residence time.

* * * * *